United States Patent [19]

Schmidt

[11] Patent Number: 4,508,862

[45] Date of Patent: Apr. 2, 1985

[54] PROCESS FOR THE PRODUCTION OF FLUID AQUEOUS DISPERSIONS OF POLYMERS OF CONJUGATED DIENES

[75] Inventor: Adolf Schmidt, Cologne, Fed. Rep. of Germany

[73] Assignee: Bayer Aktiengesellschaft, Leverkusen-Bayerwerk

[21] Appl. No.: 444,157

[22] Filed: Nov. 24, 1982

[30] Foreign Application Priority Data

Dec. 4, 1981 [DE] Fed. Rep. of Germany ....... 3148107

[51] Int. Cl.$^3$ .............................................. C08K 5/42
[52] U.S. Cl. .................................... 524/157; 524/534; 524/745; 524/502
[58] Field of Search .................. 524/157, 502, 534

[56] References Cited

U.S. PATENT DOCUMENTS

| | | | |
|---|---|---|---|
| 3,795,647 | 3/1974 | Duggan | 524/157 |
| 4,327,004 | 4/1982 | Schmidt et al. | 524/745 |

FOREIGN PATENT DOCUMENTS 964476  7/1964  Fed. Rep. of Germany ...... 524/157

*Primary Examiner*—Joseph L. Schofer
*Assistant Examiner*—N. Sarofim
*Attorney, Agent, or Firm*—Connolly and Hutz

[57] ABSTRACT

This invention relates to a process for the production of an aqueous dispersion based on homo- and copolymers of conjugated dienes which is fluid under normal conditions and has a solids content of from 25 to 55%, by weight, and an average latex particle diameter of from 20 to 150 nm, characterized in that in an aqueous dispersion based on homo- and co-polymers of conjugated dienes which has been produced by one of the conventional processes and is not fluid under normal conditions and is free from alkane polysulphonate salts, from 0.05 to 0.5%, by weight, based on the solids content of the dispersion, of a water-soluble salt of at least one alkane polysulphonate is uniformly distributed in the form of a dilute aqueous solution and is dissolved in the aqueous phase of the dispersion.

7 Claims, No Drawings

PROCESS FOR THE PRODUCTION OF FLUID AQUEOUS DISPERSIONS OF POLYMERS OF CONJUGATED DIENES

This invention relates to a process for the production of an aqueous dispersion based on homo- and co-polymers of conjugated dienes which is fluid under normal conditions and has a solids content of from 25 to 55%, by weight, and an average particle diameter of from 20 to 150 nm by the addition of a dilute aqueous solution of a water-soluble salt of at least one alkane polysulphonate to an aqueous dispersion of homo- and co-polymers of conjugated dienes which is free from alkane polysulphonates, is not fluid under normal conditions and has been produced by the conventional methods.

It is known that the production of aqueous homo- and co-polymer dispersions based on butadiene by polymerisation always requires the use of certain quantities of electrolytes, such as potassium chloride, in order that a fluid, non-pasty latex (dispersion) may be obtained (see Houben Weyl, Methoden der organischen Chemie, Volume XIV/1, 1961, page 722, line 4).

Thus, the conventional cold rubber formulations (see Houben Weyl as above, Volume XIV/1, 1961, pages 716 and 717), as well as the formulations with amine activation (see Houben Weyl, 1961, Volume XIV/1, page 727) invariably include electrolytes, such as potassium chloride or alkali metal phosphates. Sodium salts of naphthalene sulphonic acids condensed with formaldehyde are used in addition as polymerisation auxiliaries.

This polymerisation process may be used to produce latices having particle sizes of ca. 50 nm and solids contents of from 25 to 30%, by weight, which are free flowing under normal conditions, but if the solids content is raised substantially above 30%, by weight, these formulations also become pasty. To overcome this difficulty, one could conceivably increase the electrolyte content and/or the proportion of naphthalene sulphonic acids condensed with formaldehyde.

Any increase in the electrolyte content above the quantities normally used, however, leads to undesirable formation of coagulate and to a drastic reduction in the speed of polymerisation. Increased quantities of sodium salts of naphthalene sulphonic acid which have been condensed with formaldehyde, on the other hand, have the undesirable effect of darkening the colour of the latices. Another disadvantage of these condensation products is that they are not sufficiently biologically degradable and therefore give rise to effluent problems.

It was an object of the present invention to produce dispersions which are free from coagulate and free flowing under normal conditions from aqueous dispersions based on homo- and co-polymers of conjugated dienes which have been produced by the conventional polymerisation processes, have a solids content of from 25 to 55%, by weight, and a latex particle diameter of from 20 to 150 nm and are no longer free flowing under normal conditions, and the fluid, coagulate-free dispersions should be obtainable from these non-fluid dispersions without significant change in the solids content and particle size. Any additives required for solving this problem must not, of course, discolour the dispersions or produce vigorous foaming or give rise to additional problems in processing of the effluent, i.e. they should be biologically degradable.

This problem is solved by uniformly distributing a small quantity of a water-soluble salt of at least one alkane polysulphonate in the form of a dilute aqueous solution in the aqueous dispersions based on homo- and co-polymers of conjugated dienes which are free from alkane polysulphonate salts, have been produced by the conventional processes, are not fluid under normal conditions and have a solids content of from 25 to 55%, by weight, and a latex particle diameter of from 20 to 150 nm, and then dissolving this aqueous solution of the water-soluble alkane polysulphonate salt in the aqueous phase of the dispersion.

From German Offenlegungsschrift No. 30 12 821 it is known, inter alia, that polybutadiene and polychloroprene latices having solids contents above 50%, by weight, may be produced by carrying out the polymerisation in the presence of an emulsifier system used in the conventional quantities (from 1 to 5%, by weight, based on the monomers) which consists to an extent of from 50 to 100%, by weight, of the alkali metal salt of an alkane polysulphonate, However, the latices obtained in this case are fluid under normal conditions because the particles thereof are rather coarse (average latex particle diameter from 150 to 500 nm). According to the cited document, the polymer particle diameters in the dispersion increase to such an extent as the proportion of alkali metal salts of an alkane polysulphonate increases in the emulsifier system in the course of polymerisation that the dispersions of high solids content obtained have coarse particles without coagulate formation and are therefore fluid.

It was not to be gathered from the cited document, nor did the document suggest that the addition of a small quantity of a water-soluble salt of an alkane polysulphonate to an aqueous dispersion based on homo- and co-polymers of conjugated dienes which had been produced by the conventional methods, is free from alkane polysulphonate salts and is not fluid under normal conditions, would drastically lower the viscosity of such a dispersion without causing coagulate formation or foaming and would render the dispersion fluid without at the same time altering the size of the latex particles or significantly altering the solids content of the dispersion.

The present invention thus relates to a process for the production of an aqueous dispersion which is fluid under normal conditions, based on homo- and co-polymers of conjugated dienes and having a solids content of from 25 to 55%, by weight, and an average latex particle diameter of from 20 to 150 nm, characterised in that in an aqueous dispersion based on homo- and co-polymers of conjugated dienes which is free from alkane polysulphonate salts, is not fluid under normal conditions and has been produced by the conventional process, from 0.05 to 5.0%, by weight, based on the polymers, of a water-soluble salt of at least one alkane polysulphonate is uniformly distributed in the form of a dilute aqueous solution and is dissolved in the aqueous phase of the dispersion.

By the expression "not fluid under normal conditions" is meant in the present context a viscosity above 50,000 mPas, in particular above 100,000 mPas, determined at atmospheric pressure (ca. 1 bar) and 22° C. (room temperature) in a Brookfield rotation viscosimeter, spindle 4, at 6 revs/min. The dispersion is said to be fluid under the above-mentioned conditions of pressure and temperature and under the measuring conditions mentioned above if it has a viscosity below 50,000 mPas, preferably from 10,000 to 30,000 mPas, in particular below 10,000 mPas.

The dispersions obtained according to the present invention and used for the present process preferably have an average latex particle diameter of from 25 to 100 nm, i.e. they are extremely finely divided.

The conjugated dienes preferably have from 4 to 6 carbon atoms and they may be substituted by one or two chlorine atoms. Butadiene, isoprene and chlorobutadiene (chloroprene) are particularly preferred, especially butadiene.

In addition to the polymerised diene units, the copolymers of the conjugated dienes contain copolymerised units of preferably, acrylonitrile, styrene, methyl styrene, (meth)acrylic acid esters preferably having from 1 to 4 carbon atoms in the alcohol component, (meth)acrylic acid or mixtures thereof, or itaconic acid, especially acrylonitrile and/or styrene.

The homopolymers of conjugated dienes are preferred, in particular polybutadiene.

The non-fluid aqueous dispersions of homo- and copolymers of conjugated dienes to be used for the process according to the present invention are obtained by the conventional, well-known methods and with the conventional, well-known auxiliary agents (e.g. initiators, emulsifiers, regulators, electrolytes and heavy metal catalysts), (see Methoden der organischen Chemie, Houben Weyl, Volume XIV/1, 1961, pages 630 to 752, or the monograph, "Emulsion Polymerisation" by D. C. Blackley, Applied Science Publishers Ltd, 1975, London). The dispersions are always substantially free from salts of an alkane polysulphonate. The solids content thereof is from 25 to 55%, by weight, and the average latex particle diameter is in the region of from 20 to 150 nm, preferably from 25 to 100 nm.

The alkane polysulphonic acids from which the alkane polysulphonic acid salts used according to the present invention are derived have two or more, preferably from 2 to 4, in particular 2 to 3, sulphonic acid groups per molecule. The alkane group of the alkane polysulphonic acid is linear or branched and generally contains an average of from 8 to 22, preferably from 13 to 17 carbon atoms. It is preferred to use a mixture of the above-defined alkane polysulphonic acids.

The water-soluble salts of alkane sulphonic acids used are preferably metal salts, in particular alkali metal salts, such as the sodium and potassium salts, in particular the sodium salts.

The production of alkane polysulphonic acids and salts thereof is known; for example, they may be produced by sulphochlorination of alkanes, followed by saponification with a base (See Chemie und Technologie der ParaffinKohlenwasserstoffe, Akademie Verlag, Berlin, 1956, pages 395 to 474). The corresponding salts may be obtained by reaction of the alkane polysulphonic acids and metal hydroxide. The alkane polysulphochlorides are in many cases saponified with twice the stoichiometric quantity of metal hydroxide required for saponification, and the corresponding metal salts of the alkane polysulphonic acid and the corresponding metal chloride are together obtained in one process step.

The alkane polysulphonates which are obtained as a result of the sulphochlorination which is carried out as completely as possible, followed by saponification in most cases still contain minor quantities of alkane monosulphonates. These may be removed for example, by extraction with diethyl ether or alcohols or they may remain in the reaction mixture. The salts of the alkane polysulphonates to be used according to the present invention may therefore contain up to 20%, by weight, of salts of the corresponding alkane monosulphonates. The term "alkane polysulphonate" as used in the present context therefore also includes alkane polysulphonates which contain up to 20%, by weight, if alkane monosulphonate.

The salts of the alkane polysulphonates are generally used as from 5 to 30%, by weight, preferably from 8 to 10%, by weight, aqueous solutions.

Addition of the aqueous solutions of the salts of alkane polysulphonates to the aqueous dispersions based on homo- and co-polymers of conjugated dienes which are not fluid under normal conditions is carried out continuously or intermittently with very intensive stirring at a desired point in time after or shortly before termination of polymerisation, when the onset of nonfluidity may be detected (e.g. by viscosity measurements of removed samples in a DIN outflow cup) and these aqueous solutions are then uniformly distributed by further stirring and at the same time dissolved in the aqueous phase of the dispersion. The reduction in viscosity achieved enables the dispersions to be handled quite easily in spite of the fineness of the particles thereof and the relatively high solids contents, for example when they are to be removed from the reaction vessels (e.g. autoclaves) or to be emptied or filled from and into containers or mixed with other dispersions or treated for removal of the residual monomers from the crude latices.

The dispersions obtained according to the present invention are suitable as binders for the impregnation of textile sheet products and for the impregnation and reinforcement of non-woven fibre webs. They may also be used as intermediate products for the production of synthetic materials with high impact strength and they may be agglomerated both chemically and physically.

The parts and percentages given in the Examples refer to weight, unless otherwise indicated.

A. Preparation of a sodium alkane polysulphonate

A mixture of linear alkanes (from 8 to 20 carbon atoms in the molecule, average number of carbon atoms 15) is sulphochlorinated with a gas mixture of 1.1 parts of sulphur dioxide and 1.0 part of chlorine at a temperature of from 30° to 40° C. in the presence of light with stirring and simultaneous cooling. Sulphochlorination is continued until the reaction mixture has a density of 1.250 g/cm$^3$ at 45° C. The sulphochlorine content is then from 18.0 to 18.5%.

200 g of the sulphonating mixture are added dropwise to 170 g of a 50% sodium hydroxide solution which has been heated to from 50° to 60° C. The reaction mixture is maintained at a temperature of from 95° to 100° C. by cooling. After completion of the reaction, the reaction mixture is adjusted to a pH of from 9 to 10 by the addition of concentrated sodium hydroxide solution. The reaction mixture is then cooled to from 60° to 70° C.

Sodium chloride precipitates at this temperature and is removed by filtration or centrifuging. The solution free from sodium chloride is evaporated to dryness under vacuum. A mixture of 8 g of NaCl and 139 g of sodium alkane sulphonate is obtained. The sodium alkane sulphonate consists of 13.2% of sodium alkane monosulphonate and 86.8% of sodium alkane polysulphonate.

This mixture consisting of sodium alkane polysulphonate, sodium alkane monosulphonate and some sodium chloride may be used as aqueous solution according to the present invention without further purification (in the Examples, it is referred to as "sodium alkane polysulphonate solution A-1").

If the dispersion whose viscosity is to be reduced (the latex) is to be kept as free from salt as possible, a sodium alkane polysulphonate which has been purified, for example, by the following procedure may be used:

The mixture described above is first converted into a fine powder.

100 parts of the dry powder are then vigorously stirred together with 100 parts of anhydrous ethanol for 120 minutes at 40° C. Approximately 13% of the mixture goes into solution. The process is repeated with the same quantity of ethanol after suction filtration of the main constituent, which has remained undissolved. An approximately 8% solution in ethanol is obtained from the second extraction.

The two ethanol extracts contain the sodium alkane monosulphonate present in the original mixture and a proportion of polysulphonate.

100 parts of the residue which have been treated with ethanol are heated under reflux with 650 parts of anhydrous methanol with vigorous stirring for 10 hours, after which the solution is filtered from any remaining sodium chloride while still hot.

The methanol filtrate is evaporated to dryness under vacuum (rotary evaporator) and the residue is pulverized. It may be used to prepare aqueous solutions which are used according to the present invention (termed "sodium alkane polysulphonate solution A-2", see Example 1, Table 1b).

B. Preparation of a polybutadiene dispersions (viscosity ca. 55,000 mPas).

A 40 liter refined steel autoclave placed in a fume cupboard and equipped with flat paddle mixer, inlet pipe connections, bottom valve, jacket cooling, pressure and temperature measuring devices and electronic reaction temperature regulator is evacuated, purged with nitrogen and again evacuated, and the following are then introduced:

| Deionised water | 11 500 g |
|---|---|
| 15% aqueous potassium oleate solution | 3 500 g |
| Butadiene, freshly distilled | 6 500 g |

The reaction temperature is adjusted to 5° C. with stirring (120 revs/min). The following solutions are then forced in successively from small refilling vessels:

| Solution A: | Deionised water | 500 g |
|---|---|---|
| | Sodium formaldehyde sulphoxylate | 6.9 g |
| Solution B: | Butadiene | 400 g |
| | p-methane hydroperoxide, 50% as delivered | 33 g |
| Solution C: | Deionised water | 500 g |
| | 0.25 molar solution of iron-II sulphate converted into a complex with ethylene-diaminotetracetic acid sodium in water | 24.0 g |

Polymerisation sets in immediately after injection of Solutions A, B and C. Samples removed at intervals of 60 minutes are found to have the following solids contents after removal of the butadiene:

| Sample No. | Polymerisation time (min) | Solids content (%) |
|---|---|---|
| 1 | 60 | ca. 6 |
| 2 | 120 | ca. 9 |
| 3 | 180 | ca. 12 |
| 4 | 240 | ca. 16 |
| 5 | 300 | ca. 21 |
| 6 | 360 | ca. 25 |
| 7 | 420 | ca. 30 |

The viscosity of the latex in the autoclave begins to increase from Sample 4 onwards and removal of the heat of polymerisation becomes increasingly difficult. The reaction temperature rises to ca. 20° C. between samples 6 and 7 in spite of vigorous external cooling ($-10°$ C.) and then rapidly falls.

When polymerisation has been terminated at a solids content of ca 30%, 8.6 g of diethyl hydroxylamine dissolved in 200 ml of water are added as reaction stopper and the dispersion is then forced out of the autoclave with a slight excess nitrogen pressure (ca. 0.5 bar). Sample loss: 700 g. Net weight of crude latex: 20.6 kg After the pasty dispersion has been vigorously stirred under a fume hood and heated to room temperature (22° C.), the following dispersion data are obtained:

| Solids content | ca. 30% |
|---|---|
| pH | 10.4 |
| Electric conductivity | 3.8 mS (= milliSiemens) |

(0.746 g of KCl per liter of water were found to have a conductivity of 1.4 mS with the conductivity measuring instrument employed).

Latex particle diameter determined by laser correlation spectroscopy: 39 nm.

A Brookfield Synchro-Lectric viscosimeter, Model LVF, a precision instrument of Brookfield Engin. Laboratories Inc., was used to determine the viscosity characteristics. The measurements were carried out with the aid of four different test bodies (PK 1 to 4) or "spindles 1 to 4" included with this apparatus and used at different speeds of rotation, viz. 6, 12, 20, 60 revs/min, at a temperature of 22° C.

Where possible, the outflow time of the dispersions was also determined in an outflow cup DIN 53211. The dispersion prepared according to Method B was so viscous that it could not pass through the outflow cup even when a nozzle of internal diameter of 8 mm was used. The following Brookfield viscosities were measured (dispersion tempered to exactly 22° C.):

| Spindle 4 | 6 revs/min | 55,000 mPas |
|---|---|---|
| | 12 revs/min | 26,000 mPas |
| | 30 revs/min | 13,900 mPas |
| | 60 revs/min | 8,360 mPas |

C. Preparation of a polybutadiene dispersion (viscosity > 100 000 mPas)

The following were introduced into a 40 liter autoclave as described under B after it had been evacuated and purged with nitrogen:

| Deionised water | 7 133 g |
|---|---|
| Potassium oleate solution, 14% | 7 867 g |
| Butadiene, freshly distilled | 6 500 g |

The reaction temperature was adjusted to 5° C. with stirring (120 revs/min). The following solutions were then pumped in every 5 minutes from small pressurised re-filling vessels:

| Solution A: | Deionised water | 500 g |
| --- | --- | --- |
| | Sodium formaldehyde sulphoxylate | 6.9 g |
| Solution B: | Butadiene | 500 g |
| | p-methane hydroperoxide, 50%, as delivered | 33 g |
| Solution C: | Deionised water | 500 g |
| | 0.25 molar aqueous solution of iron-II sulphate converted into complex form with ethylene diaminotetracetic acid sodium | 24.0 g |

Polymerisation set in immediately after injection of Solutions A, B and C. Samples removed at 60 minute intervals were found to have the following solids contents after removal of the butadiene:

| Sample No. | Polymerisation time (min) | Solids content % |
| --- | --- | --- |
| 1 | 60 | 9 |
| 2 | 120 | 11 |
| 3 | 180 | 15 |
| 4 | 240 | 18 |
| 5 | 300 | 21 |
| 6 | 360 | 25 |
| 7 | 420 | 30 |

The viscosity of the latex in the autoclave began to rise sharply from Sample 5 onwards and removal of the heat of polymerisation became progressively more difficult. By the time Sample 7 was removed, the reaction temperature had risen to 35° C. in spite of cooling with a jacket filled with brine at −10° C.

The reaction was then stopped by the addition of 8.6 g of diethyl hydroxylamine in 200 g of water and the mixture was discharged.

| Sample loss | 410 g |
| --- | --- |
| Net weight of crude latex | 20.7 kg. |

The dispersion was extremely viscous. After it has been thoroughly stirred under a hood and heated to room temperature (22° C., the following data characterising the dispersion were obtained:

| Solids content | ca. 30% |
| --- | --- |
| pH | 11.2 |
| Electric conductivity | 5.9 mS (milliSiemens). |

(0.476 g of potassium chloride per liter of water were found to have a conductivity of 1.4 mS in te conductivity measuring instrument used).

Latex particle diameter: 33 nm determined by laser correlation spectroscopy.

Viscosity characteristics: The viscosity of the latex lay outside the range of measurement of the Brookfield Synchro-Lectic viscosimeter Model LVF employed (greater than 100,000 mPas with spindles 4 and 6 revs/min). At this high viscosity, measurement in a DIN 53211 outflow cup was also impossible.

D. Preparation of a butadiene-styrene latex (viscosity 51,000 mPas)

The following are introduced into a 40 liter autoclave as under B after it had been evacuated and purged with nitrogen:

| A | Deionised water | 12 000 g |
| --- | --- | --- |
| | Potassium oleate solution 15%, aqueous | 5 000 g |
| B | p-methane hydroperoxide, 50% as delivered | 25 g |
| C | t-dodecyl mercaptan | 14.4 g |
| D | 0.25 molar aqueous solution of iron-II sulphate, converted into complex form with ethylene diaminotetracetic acid sodium | 15.0 g |
| E | Deionised water | 500 g |
| | Sodium formaldehyde sulphoxylate | 6.5 g |
| F | Butadiene | 8 000 g |
| | Styrene | 3 450 g |

A is introduced into the autoclave with exclusion of atmospheric oxygen, and B, C, D and monomer mixture F are then added after this emulsifier solution had been cooled to 5° C.

The temperature is again adjusted to 5° C. and the reaction mixture is stirred for 1 hour at 5° C. to establish physical equilibrium, and polymerisation is then started by the injection of E. Speed of stirring: 120 revs/min.

After a polymerisation time of 7½ hours, the reaction temperature rises noticeably (external jacket temperature constant at −10° C.) and reaches a maximum of 25° C. after ca. 10 hours. A solids content of 38% is reached after a polymerisation time of ca. 15 hours and the reaction is stopped with a solution of 6.5 g of diethyl hydroxylamine in 200 g of water. The autoclave contents are then forced out with nitrogen and stirred under a hood.

The crude latex has a solids content of 38%, a pH of 11, an electric conductivity of 3.9 mS, a latex particle diameter of 55 nm determined by laser correlation spectroscopy, and a viscosity of ca. 55,000 mPas determined with spindle 4 of the Brookfield viscosimeter at 6 revs/min and 22° C.

The latex is freed from residual monomers under vacuum and the quantity of water lost by distillation is replaced. Altogether, approximately 10% of the water in the latex is distilled off and replaced by a corresponding quantity of freshly deionised water.

The demonomerised latex accurately adjusted to a solids content of 38% was found to have a latex particle size of 55 nm and a viscosity of ca. 51,000 mPas determined with spindle 4 of the Brookfield viscosimeter at 6 revs/min and at 22° C.

E. Preparation of a butadiene-acrylonitrile latex (viscosity > 100 000 mPas)

The following are introduced into a 40 liter autoclave as under B after evacuation and purging with nitrogen:

| A | Deionised water | 12 750 g |
| --- | --- | --- |
| | Potassium oleate solution, 15% in water | 4 516 g |
| B | p-methane hydroperoxide, 50% as delivered | 50.0 g |
| C | Iron-II sulphate converted into complex form with ethylene diamino tetracetic acid sodium, 0.25 molar aqueous solution | 22.5 g |
| D | Deionised water | 1 000 g |
| | Sodium formaldehyde sulphoxylate | 13.0 g |
| E | Butadiene | 7 200 g |
| | Acrylonitrile | 800 g |
| | t-dodecyl mercaptan | 14.4 g |

Substance A is introduced into the reaction vessel and then cooled to 5° C. After purging with nitrogen, B, C and E are added. After adjustment of the temperature in the autoclave to 5° C., polymerisation is started by the addition of D (sodium formaldehyde sulphoxylate solution).

Polymerisation sets in immediately after the injection of solution D. Samples were removed hourly after the addition of D and the solids contents thereof were determined.

| Sample No. | Polymerisation time (min) | Solids content |
|---|---|---|
| 1 | 60 | 5.0 |
| 2 | 120 | 7.0 |
| 3 | 180 | 11.7 |
| 4 | 240 | 16.1 |
| 5 | 300 | 19.5 |
| 6 | 360 | 24.5 |
| 7 | 420 | 32.0 |

The reaction temperature begins to rise after sample 5 in spite of external cooling (−10° C.) and reaches ca. 15° C. at sample 6 and ca. 40° C. at sample 7.

Immediately after sample 7, the reaction is stopped by the addition of 15 g of diethyl hydroxylamine dissolved in 200 g of water and the reaction mixture is discharged. A viscous, pasty, foamy mass is forced out of the autoclave. The viscosity of this mass (>100,000 mPas) lies outside the range of measurement of the Brookfield viscosimeter (spindle 4, 6 revs/min, 22° C.) and the mass is not fluid. It is collected in an enamelled vessel.

The latex particle size of the pasty dispersion is 41 nm measured by laser correlation spectroscopy.

EXAMPLE 1
(according to the present invention)

A total of 0.06; 0.8; 1.0; 1.2; 1.4; 1.6 parts of a 9.5% aqueous solution of the sodium alkane polysulphonate prepared according to A-1 is added at 22° C. with stirring (200 revs/min) to 200 parts of the polybutadiene dispersion prepared according to B.

The first portion (0.6 parts) is added all at once while the subsequent portions are added in stages of 0.2 parts each (see Table 1a).

The addition of each portion takes place within ca. 5 minutes and is followed by 10 minutes' stirring, and the Brookfield viscosity is then determined with spindle 4 at various speeds of rotation. This procedure is employed in all Examples.

The dramatic viscosity reducing effect of the addition of polysulphonate may be seen from the test results in Table 1a. These viscosities may still be measured after the substances have been left to stand for several days and several weeks. Substantially the same results are then obtained, i.e. the viscosity reducing effect persists.

The latex obtainable after the addition of a total of 1.6 parts of a 9.5% polysulphonate solution of 200 g of dispersion has a greatly reduced viscosity and in contrast to the initial dispersion it is fluid, and in the DIN 53211 outflow cup it is found to have an outflow time of 19.3 seconds from a nozzle of 8 mm internal diameter. When the dispersion had been left to stand for 3 days in a closed vessel, it was found to have an outflow time of 18.9 seconds (nozzle 8 mm internal diameter The particle size of the dispersion was not altered by the addition of polysulphonate. When the initial latex had an average particle diameter of ca. 39 nm, the value after addition of the polysulphonate was found to be ca. 40 nm, which is within the limits of accuracy of measurement of laser correlation spectroscopy.

Addition of polysulphonate to the dispersion did not cause formation of coagulate or undesirable foaming.

Virtually the same results are obtained when instead of polysulphonate solution according to A-1 a corresponding polysulphonate solution according to A-2 which is free from sodium chloride and monosulphonate is added to dispersion B (see results of measurements in Table 1b). The method of purification described in section A for preparing a sodium alkane polysulphonate virtually free from sodium chloride and monosulphonate is therefore not absolutely necessary for obtaining the viscosity reducing effect.

TABLE 1a

| Initial contents: 200 parts of dispersion B | | | | | | | |
|---|---|---|---|---|---|---|---|
| Total addition in parts+ of 9.5% aqueous sodium alkane polysulphonate solution prepared according to A1 | 0 | 0.6 | 0.8 | 1.0 | 1.2 | 1.4 | 1.6 |
| Brookfield viscosimeter spindle 4, 22° C. Revolutions per minute (RPM): | | | | | | | |
| 6 RPM, viscosity in mPas | 55 000 | 19 700 | 5 700 | 4 100 | 2 100 | 1 500 | 800 |
| 12 RPM, viscosity in mPas | 26 000 | 15 200 | 5 350 | 4 150 | 2 200 | 1 500 | 850 |
| 30 RPM, viscosity in mPas | 13 900 | 9 180 | 4 320 | 3 580 | 2 060 | 1 400 | 900 |
| 60 RPM, viscosity in mPas | 8 360 | 5 800 | 3 230 | 2 830 | 1 820 | 1 360 | 900 |

+The parts of sodium alkane sulphonate solution shown in the first row always denote the total number of parts added, as also in all the following Tables.

TABLE 1b

| Initial contents: 200 parts of dispersion B | | | | | | | |
|---|---|---|---|---|---|---|---|
| Total addition in parts+ of 9.5% aqueous sodium alkane polysulphonate solution prepared according to A-2 (free from sodium chloride and monosulphonate) | 0 | 0.6 | 0.8 | 1.0 | 1.2 | 1.4 | 1.6 |
| Brookfield viscosimeter spindle 4, 22° C. | | | | | | | |

TABLE 1b-continued

| Revolutions per minute (RPM): | | | | | | | |
|---|---|---|---|---|---|---|---|
| 6 RPM, viscosity in mPas | 55 000 | 18 100 | 5 010 | 3 800 | 1 800 | 1 200 | 700 |
| 12 RPM, viscosity in mPas | 26 000 | 14 800 | 4 980 | 3 615 | 2 100 | 1 180 | 710 |
| 30 RPM, viscosity in mPas | 13 900 | 9 150 | 4 320 | 3 580 | 2 000 | 1 400 | 750 |
| 60 RPM, viscosity in mPas | 8 360 | 5 460 | 3 200 | 2 950 | 1 500 | 1 250 | 700 |

EXAMPLE 2

(according to the present invention)

A total of 1.0, 1.2, 1.4 and 1.6 parts, respectively, of a 9.5% aqueous solution of the sodium alkane polysulphonate prepared according to A are added at 22° C., with stirring (200 revs/min) to 200 parts of the highly viscous polybutadiene dispersion prepared according to C.

The first portion (1.0 parts) is added all at once, the subsequent portions are added in stages of 0.2 parts (see Table 2).

The test results shown in Table 2 demonstrate the powerful viscosity reducing effect of the addition of polysulphonate. The effect is lasting since virtually the same results of Brookfield viscosity are obtained after the samples have been left to stand for several weeks.

The particle size of the dispersion was not altered by the polysulphonate addition according to Table 2. When the initial latex was found to have an average latex particle diameter of ca. 33 nm, the latex particle diameter after addition of the polysulphonate solution was still found to be 33 nm, determined by laser correlation spectroscopy.

No formation of coagulate occurred when polysulphonate solution was added to the pasty, initially hardly stirrable dispersion, nor could foam formation be detected. After the addition of 1.6 parts of a 9.5% aqueous polysulphonate solution to 200 parts of dispersion, the latex could easily be stirred and could be poured out of the vessel.

TABLE 2

| Initial contents: 200 parts of dispersion C Total addition in parts of 9.5% aqueous sodium alkane polysulphonate solution prepared according to A1 | 0 | 1.0 | 1.2 | 1.4 | 1.6 |
|---|---|---|---|---|---|

TABLE 2-continued

| Brookfield viscosimeter spindle 4, 22° C. Revolutions per minute (RPM): | | | | | |
|---|---|---|---|---|---|
| 6 RPM, viscosity in mPas | >100 000 | 15 700 | 9 700 | 6 800 | 4 600 |
| 12 RPM, viscosity in mPas | >100 000 | 13 600 | 8 750 | 6 750 | 4 650 |
| 30 RPM, viscosity in mPas | >100 000 | 9 520 | 5 960 | 5 740 | 4 140 |
| 60 RPM, viscosity in mPas | >100 000 | 6 470 | 5 130 | 4 490 | 3 430 |

COMPARISON EXAMPLE 1

(to Example 1)

A total of 0.6, 0.8, 1.0, 1.2, 1.4, 1.6, 2.0, 3.0, 4.0, 5.0, 7.0 and 9.0 parts, respectively, of a 9.5% aqueous solution of a sodium alkane monosulphonate solution based on the same paraffin fraction as in A and containing from 13 to 17 carbon atoms in the alkane group were added at 22° C. with stirring (200 revs/min) to 200 parts of the polybutadiene dispersion prepared according to B.

The measurements were carried out as described in Example 1.

The test results shown in Table 3 indicate that although the addition of a sodium alkane monosulphonate solution to dispersion B results in a certain reduction in viscosity, this reduction is much less than that obtained by the addition of sodium alkane polysulphonate (compare Table 3 with Table 1a or 1b).

Furthermore, the underlying polybutadiene latex shows a very strong tendency to foam after the addition of sodium alkane monosulphonate, which is manifested by the fluctuating and difficulty reducible viscosity measurements.

TABLE 3

| Initial contents: 200 parts of dispersion B Total addition in parts of 9.5% aqueous sodium alkane monosulphonate solution | 0 | 0.6 | 0.8 | 1.0 | 1.2 | 1.4 | 1.6 | 2.0 | 3.0 | 4.0 | 5.0 | 7.0 | 9.0 |
|---|---|---|---|---|---|---|---|---|---|---|---|---|---|
| Brookfield viscosimeter spindle 4, 22° C. Revolutions per minute (RPM): | | | | | | | | | | | | | |
| 6 RPM, viscosity in mPas | 55000 | 48700 | 48100 | 47800 | 43100 | 42200 | 42100 | 42000 | 25600 | 21400 | 20300 | 7500 | 3500 |
| 12 RPM, viscosity in mPas | 26000 | 26150 | 26200 | 27350 | 26120 | 25300 | 26150 | 27150 | 17350 | 15500 | 14850 | 6950 | 3300 |
| 30 RPM, viscosity in mPas | 13900 | 12640 | 12640 | 13640 | 12890 | 12400 | 12500 | 13080 | 9440 | 8840 | 8900 | 5120 | 2940 |
| 60 RPM, viscosity in mPas | 8360 | 7390 | 7400 | 7770 | 7510 | 7470 | 7420 | 7430 | 5660 | 5370 | 5520 | 3570 | 2440 |

COMPARISON EXAMPLE 2

(to Example 2)

A total of 0.6, 1.2, 1.4, 1.6, 7.6, 9.6, 11.6 and 16.6 parts, respectively, of water are added at 22° C., with stirring (200 revs/min) to 200 parts of the highly viscous polybutadiene dispersion prepared according to C.

butadiene latices in Examples 1 and 2 (see Table 5, columns 2 to 9).

TABLE 5

| Initial contents: 200 Parts of latex according to D, 38%, demonomerized Total addition in number of parts of 9.5% sodium alkane polysulphonate solution according to A-1 | 0 | 0.4 | 0.6 | 0.8 | 1.0 | 1.2 | 1.4 | 1.6 | 2.2 |
| --- | --- | --- | --- | --- | --- | --- | --- | --- | --- |
| Brookfield viscosimeter Measurement at 22° C., spindle 4 Revolutions per minute (RPM) | | | | | | | | | |
| 6 RPM, viscosity in mPas | 51 100 | 42 400 | 33 000 | 27 800 | 23 300 | 18 400 | 11 600 | 7 200 | 2 300* |
| 12 RPM, viscosity in mPas | 25 500 | 23 000 | 18 450 | 16 050 | 14 050 | 11 650 | 8 600 | 5 900 | 2 050 |
| 30 RPM, viscosity in mPas | 10 860 | 10 140 | 8 540 | 7 600 | 6 900 | 6 000 | 4 920 | 3 840 | 1 800 |
| 60 RPM, viscosity in mPas | 5 930 | 5 610 | 4 830 | 4 440 | 3 960 | 3 550 | 3 040 | 3 040 | 1 470 |

*After the addition of 2.2 parts of 9.5% sodium alkane polysulphonate solution, the latex has an outflow time of 9 seconds in the DIN 53211 outflow cup (8 mm nozzle).

The viscosity of the dispersion could be expected to be reduced by the addition of water (see Table 4), but the additions of water up to a total of 1.6 parts are insufficient to produce a marked reduction in viscosity (see Table 2, where 1.6 parts of polysulphonate solution are sufficient to convert the dispersion into a fluid state). It is only after the addition of 7.6 parts, by weight, of water or more that a visible effect is produced and only after a 10-fold quantity of water has been added (16.6 parts) is the viscosity (5070 mPas) found to approximate that obtained after the addition of 1.6 parts of a 9.5% aqueous sodium alkane sulphonate solution (4600 mPas).

TABLE 4

| Initial contents: 200 Parts of dispersion C Addition of water in parts | 0 | 0.6 | 1.2 | 1.4 | 1.6 | 7.6 | 9.6 | 11.6 | 16.6 |
| --- | --- | --- | --- | --- | --- | --- | --- | --- | --- |
| Brookfield viscosimeter spindle 4, 22° C. Revolutions per minute (RPM): | | | | | | | | | |
| 6 RPM, viscosity in mPas | greater than 100 000 mPas | | | | | 32 300 | 28 600 | 21 700 | 5 070 |
| 12 RPM, viscosity in mPas | | | | | | 23 150 | 20 950 | 17 000 | 5 500 |
| 30 RPM, viscosity in mPas | | | | | | 13 020 | 12 140 | 10 660 | 4 660 |
| 60 RPM, viscosity in mPas | | | | | | 8 040 | 7 580 | 6 940 | 3 720 |

EXAMPLE 3

(according to the present invention)

The demonomerized, 38% butadiene-styrene latex prepared according to D, particle size 55 nm, has the viscosity characteristics shown in column 1 of Table 5.

The addition of sodium alkane polysulphonate solution according to A-1 again has a pronounced and lasting viscosity reducing effect as described for the polybutadiene latices in Examples 1 and 2 (see Table 5, columns 2 to 9).

EXAMPLE 4

(according to the present invention)

When 1% of solid polysulphonate according to A-1, based on the solids content of the dispersion, are added in the form of a 10% aqueous solution of the finely divided, viscous, non-fluid and foamy dispersion obtainable according to E, which has a solids content of ca. 32%, the foam collapses and the dispersion may be vigorously stirred and becomes highly fluid in the process. It may subsequently be freed from residual monomers under vacuum in the conventional manner without formation of coagulate or alteration of the latex particle size. The demonomerized dispersion has the following features:

Particle size according to laser correlation spectroscopy: 41 nm

Solids content: 34.6%

Outflow times in DIN 53211 outflow cup (45 mm nozzle): 22.7 sec.

The Brookfield viscosity of 22° C., 6 RPM, spindle 4, was less than 100 mPas. The viscosity measured with spindle 1 at RPM and 22° C. was 83 mPas.

I claim:

1. A process for the production of a fluid, aqueous dispersion of one or more conjugated diene homo- and-/or copolymers, which dispersion has a viscosity of less than 50,000 mPas, measured at 1 bar and 22° C., a solids content of from 25 to 55%, by weight, and an average particle diameter of from 20 to 150 nm, which comprises:
adding to a non-fluid, alkane polysulfonate salt-free, aqueous dispersion of one or more conjugated diene homo- and/or copolymers, which non-fluid, alkane polysulfonate salt-free, aqueous dispersion has a viscosity of more than 50,000 mPas, as measured at 1 bar and 22° C., a solid content of from 22 to 55%, by weight, and an average particle diameter of from 20 to 150 nm,
one or more water soluble salts of one or more alkane polysulfonates in an amount of 0.05 to 0.5%, by weight, based on the solids content of the non-fluid, alkane polysulfonate and in the form of a dilute aqueous solution.

2. A process as claimed in claim 1 in which a from 5 to 30%, by weight, salt solution is used.

3. A process as claimed in claim 2 in which a from 8 to 10%, by weight, salt solution is used.

4. A process as claimed in claim 1 in which a sodium or potassium salt is used.

5. A process as claimed in claim 1 in which a $C_8$–$C_{22}$ alkane polysulphonate is used.

6. A process as claimed in claim 5 in which a $C_{13}$–$C_{17}$ alkane polysulphonate salt is used.

7. A fluid aqueous dispersion of one or more conjugated diene homo- and/or copolymers which dispersion has a viscosity of less than 50,000 mPas, measured at 1 bar and 22° C., a solids content of from 25 to 55%, by weight, and an average particle diameter of from 20 to 150 nm, said fluid, aqueous dispersion obtained by the process of claim 1.

* * * * *